Oct. 5, 1965

B. SHERSTIUK 3,210,615

CONTROL CIRCUIT

Filed June 25, 1962

INVENTOR.
Boris Sherstiuk

BY
C. A. Gullbrandsen
Atty.

United States Patent Office 3,210,615

Patented Oct. 5, 1965

3,210,615
CONTROL CIRCUIT

Boris Sherstiuk, Chicago, Ill., assignor to Automatic Electric Laboratories, Inc., Northlake, Ill., a corporation of Delaware Filed June 25, 1962, Ser. No. 204,936
1 Claim. (Cl. 317—155.5)

This invention relates to control circuits broadly, and more particularly, to a control circuit which utilizes a reed-type relay and provides up to four distinct output conditions.

Control circuits which render two switching states, for example operated and non-operated, are frequently used in the prior art. Moreover, it is known to obtain three output conditions from the use of one or two marginal operation type relays with "X" contacts.

Although these arrangements perform satisfactorily for the most part their application is limited due to the fact that they can render only two output conditions or they require critical contact adjustment and are less reliable than reed-type relays which use encapsulated reed switches for their switching element.

In contrast according to the control circuit of the invention up to four switching states can be provided by employing a reed type relay that is connected to a single input lead or control lead. Thus, one or two markings or output conditions are achieved in addition to the aforementioned operated and non-operated states. Normally to achieve this result more than one input lead and more than one relay is required. In instances where space is a consideration the use of but one lead to every switching element instead of two input leads is most advantageous. For example, in switching systems using a reed relay crosspoint switching matrix one additional encapsulated reed switch would be required at each crosspoint switching stage in order to provide the additional control paths. This requirement obviously would add to the cost of manufacture and to the complexity of the system.

Therefore, the primary object of the invention is to provide a reliable control circuit which is capable of rendering up to four output switching states though having a single control lead.

Another object of the invention is to provide a control circuit whose cost of manufacture is minimized.

In accordance with these objectives the invention features a control circuit having an input signalling means, a control element, and a controlled circuit, the signalling means includes a four position switch that is connected to one end of the control lead. The latter serves as the input lead to the control element and is more specifically connected to the two windings of the relay coil. The four positions of the switch are formed by placing different voltages potentials at each position. Therefore, according to the preferred embodiment one position of the switch is at ground potential, another at battery potential, another at resistance ground, and another is an open condition. Under the first three conditions all or at least some of the reed switches operate. In the open condition the switches do not operate, however, the control element or relay does render a distinct mark to the controlled circuit by virtue of the relay having at least one break contact.

The control element features a particular reed-type relay which includes an integrally molded bobbin, a permanent magnet, and at least one "break" and one "make" encapsulated contact switch. The bobbin consists of an oval-shaped, for instance, spool portion with a flange at each end thereof. The oval shape of the spool portion aids in locating the two types of switches with respect to the permanent magnet so that only the one type are effected by the magnetic field and function as break contacts while the other type are not effected and function as make contacts. Thus, the one make contact according to the preferred embodiment is far enough away from the permanent magnet so as not to be influenced by its field. The only force, therefore, that effectively acts upon the make contact switch is that produced through energization of the relay coil. This electromagnetic field is strong enough to overcome the inherent inertia forces of the reed members of the switches.

The coil comprises two windings which are differentially wound on the spool portion. That is, one winding is wound in one direction and the other winding is wound in the opposite direction. As aforementioned the two windings are connected to the single lead of the signalling means. Ground potential is placed at the end of one of the windings and battery at the end of the other winding. This permits more variation in the operation of the relay and attributes to the possibility of obtaining four output conditions from the relay.

The remote or controlled circuit is connected to the reeds of the switches so as to operate other relays or other electrical devices.

These and other objects and features of the invention will become more clearly understood upon a careful reading of the detailed description here following with a reference to the accompanying drawings of which:

Figure 1:
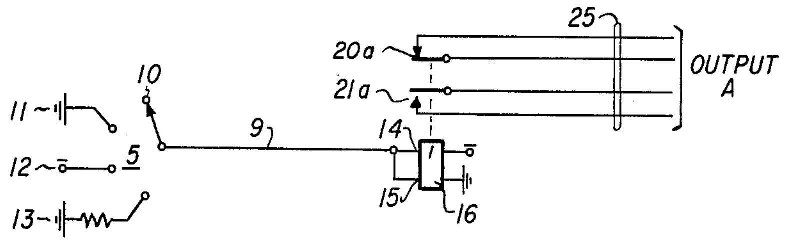
FIG. 1 shows the control circuit according to the invention when the signalling means thereof is in an open position.

Referring now to FIGS. 1–4 of the drawings, the control circuit comprises a signalling means 5, a control element 16, and a controlled circuit 25. The signalling means 5 is virtually a four position switch having a single output lead 9. Each position is distinguished by being associated with a different voltage potential. The first position 10 is an open position which does not provide any signal over lead 9. The second position 11 provides ground potential over lead 9 to relay 16. The third position 12 provides battery potential, and the fourth position 13 provides resistance ground potential over the lead.

Figure 5:
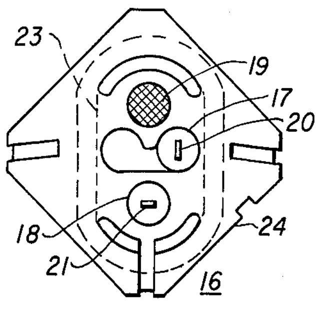
FIG. 5 shows an end view of the control element of the control circuit.
Figure 6:
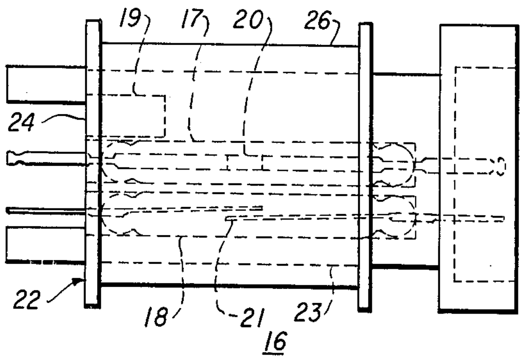
FIG. 6 shows a side view of the control element of the control circuit.

Referring now to FIGS. 5 and 6, control element 16 is what is commonly referred to in the prior art as a reed-type relay and includes: a molded bobbin 22 which has, an oval-shaped spool portion 23 with a flange 24 at each end thereof; a coil 26 wound on the spool portion comprising windings 14 and 15; two, for instance, encapsulated reed switches 17 and 18 having corresponding inherently opened contacts 20 and 21 respectively which are placed within the spool portion 23; and a permanent magnet 19 also placed within the spool portion 23 and positioned so as to magnetically cooperate with switch 17 causing it to function as a break contact in the relay. The result of the assembly arrangement is the formation of one break contact 17 and one make contact 18 within a single relay. Therefore, permanent magnet 19 is placed adjacent to switch 17 and sufficiently separated and magnetically insulated from switch 18.

Coil 26 is differentially wound on spool portion 23 and therefore winding 14 thereof is wound in one direction and winding 15 is wound in the opposite direction. One end of both windings is connected to lead 9 whereas the opposite end of each is connected to ground and battery potential respectively. When winding 14 is energized the electromagnetic field set up opposes the magnetic field of the permanent magnet and causes contacts 20 and 21 to operate. When winding 15 is energized the electromagnetic field aids the magnetic field of the permanent magnet and causes contacts 21 to close and does not produce any apparent change in break contacts 20.

FIG. 1 illustrates a first output condition of the control circuit, designated as output A, and is achieved when switch 16 is in open position 10. When in this position no signal is provided over lead 9. This results in no current flowing in either winding 14 and 15 and the normal characteristics of the particular switches prevailing. More specifically this results in the break contacts 20A remaining closed due to the influence of magnet 19 and the make contacts 21A remaining open due to the inherent characteristics of the reeds.

Figures 2, 3, 4:
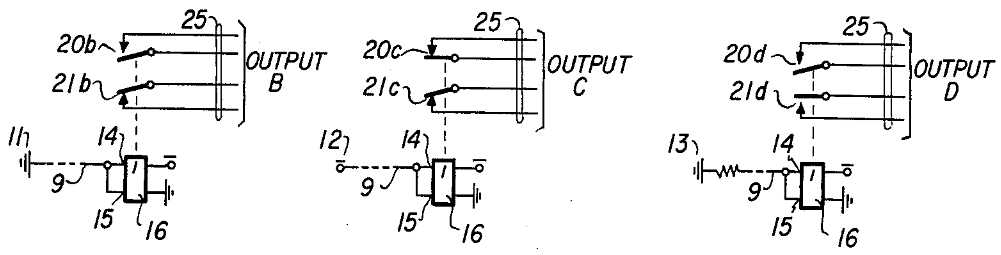
FIG. 2 shows the control circuit when the signalling means is at ground potential.
FIG. 3 shows the control circuit when the signalling means is at battery potential.
FIG. 4 shows the control circuit when the signalling means is at resistance ground.

FIG. 2 illustrates a second output condition B which is produced when switch 16 is in position 11. Under this condition ground is provided over lead 9 which in turn energizes winding 14 while shorting out winding 15. With winding 14 energized the electromagnetic field set up by the winding is great enough to sufficiently oppose the magnetic field set up by the magnet 19 and open break contacts 20B and to close make contacts 21B. Thus, break contacts 20B are opened and make contacts 21B are closed.

FIG. 3 illustrates a third output condition C which occurs when switch 16 is in position 12. Under this condition battery is provided over lead 9 which in turn energizes winding 15 while shorting out winding 14. This results in the make contacts 21C operating or closing and the break contacts 20C remaining closed. Although in this case the electromagnetic field set up by the winding 15 is strong enough to cause make contacts 21C to close the field does not alter break contacts 20C as was the case under the previous condition. This is explained by noting that the field set up by the winding 15 is coincident with the field set up by the permanent magnet. Thus the two fields are coincident with one another and not opposing.

FIG. 4 illustrates a fourth output condition D which occurs when switch 16 is in position 13. Under this condition resistance battery, for example, is provided over lead 9 which results in winding 14 of the relay being energized to a greater extent than winding 15. This results in break contacts 20D being opened and make contacts 21D remaining unchanged. This result is due to the fact that less force is required to open the break contacts 20D than is required to close contacts 21D. The inertia forces that must be overcome to close contacts 21D is something more than the force necessary to sufficiently oppose the permanent magnet 19.

The markings aforementioned are made by using a simplified straight forward control circuit employing reliable reed relays operable from a single input lead. This feature becomes most significant when noting that in the prior art the switching matrices employing control circuits which renders up to four output conditions used additional input leads or additional relays and electrical components to accomplish this end. Thus in the prior art the control circuits were more complex and more costly. In contrast the control circuit according to the invention is much simplified and the corresponding cost of manufacture reduced to a minimum.

The preferred circuit is shown and described in detail, however, it is to be understood that this was done merely by way of example and that there are many changes in the circuit that could be made without departing from the spirit and scope of the invention as hereinafter claimed.

What is claimed is:

A signalling arrangement comprising: a reed relay with a bobbin, a coil supported by said bobbin, a first and second encapsulated reed switch positioned within said bobbin and each having a pair of contacts, and a permanent magnet supported within said bobbin and located substantially adjacent to said first switch to hold the pair of contacts thereof normally closed, said coil comprising a first winding and a second winding differentially wound with respect to each other and each having terminal ends, one terminal end of said first winding being connected to a first potential, and one terminal end of said second winding being connected to a second potential; a control lead having two ends, one end thereof connected to the opposite terminal ends of said first and second winding; and means connected to the opposite end of said control lead for selectively energizing said coil in one of three modes, in the first of said modes the other end of said control lead being connected to one potential condition so that said first winding is energized and the second winding shorted out to close the contact of said second switch in addition to the contacts of said first switch, in the second of said modes said other end of said control lead being connected to another potential condition so that said second winding is energized and said first winding is shorted out to open the contacts of said first switch and to close the contacts of said second switch and in the third of said modes said other end of said control lead being in an open condition so that two windings are energized in series with each other whereby the contacts of the said first switch remain closed and the contacts of said second switch remain open.

References Cited by the Examiner

UNITED STATES PATENTS

| | | | |
|---|---|---|---|
| 2,490,048 | 12/49 | Gohorel. | |
| 2,999,227 | 9/61 | Hezel et al. | |
| 3,020,369 | 2/62 | Jacobson | 200—87 |
| 3,088,056 | 4/63 | Tevonian | 317—155.5 X |

FOREIGN PATENTS

| | | |
|---|---|---|
| 1,147,656 | 4/63 | Germany. |

SAMUEL BERNSTEIN, *Primary Examiner.*